Patented June 28, 1927.

1,633,871

UNITED STATES PATENT OFFICE.

PAUL W. PRUTZMAN, OF LOS ANGELES, CALIFORNIA, ASSIGNOR, BY MESNE ASSIGNMENTS, TO CONTACT FILTRATION COMPANY, OF SAN FRANCISCO, CALIFORNIA, A CORPORATION OF DELAWARE.

METHOD OF REVIVIFYING SPENT ADSORBENTS FOR OIL TREATMENTS.

No Drawing. Application filed September 2, 1922. Serial No. 586,031.

The hereinafter described invention relates to the treatment of spent adsorbents in such a manner as to restore the same to their original adsorbent values and to do so by avoiding the tedious and difficult operations of drying and burning.

In the art of refining oils of either animal, vegetable or mineral origin it is common practice to submit the oil, for the purpose of purifying it and of discharging a portion of its color, to what is usually termed a filtration or bleach. Such operation is properly termed an adsorption. It consists in acting on the oil with a granular or powdered porous solid which possesses a large superficial area per unit of weight. Such solids attract to and hold fixed on their surface certain undesirable constituents or impurities occurring in the untreated oils, and when the solids are removed from the oil, by filtration or other mechanical means, the impurities are removed from the oil therewith.

As the major portion of the superficial area of a grain of porous material consists of the inner surface of the pores, the adsorbed impurities are drawn into the pores and are often held there very firmly. Also, if these pores are of relatively large diameter, so that the layer of matter adsorbed on the wall does not suffice to close the pores, an important quantity of the oil itself will be drawn into the pore and held there by capillarity.

Granulated adsorbents, that is, such as are of coarse enough mesh to allow the oil to flow between adjacent grains, are usually applied to the oil by first forming them into deep packs on screens or other permeable retaining media, and flowing or forcing the oil through such packs. When the adsorbent action has ceased, due to saturation of the adsorptive value, excess oil is removed from the pack by allowing it to drain and thereafter blowing air through the pack to displace the entrained oil.

Pulverized adsorbents, of 100, 150 or 200 mesh, and often even much finer than this, are now commonly applied to oil. These fine powders are admixed with the oil to be purified, and as they form a dense and impermeable mass when compacted they are usually formed up into a relatively thin cake in a filter press or thrown out by means of a centrifuge. In either case the excess oil is discharged primarily by pressure applied to the cake, and sometimes in addition to this by air blowing.

Whether fine or coarse adsorbent is being handled, the oil held in the grain by capillarity must be removed. This is readily accomplished by the use of a suitable solvent, almost always a light petroleum distillate such as gasoline, wash naphtha or kerosene. As the oil is entirely miscible with such solvent and is not firmly retained by the adsorbent, it is usually removed with ease. It is also easy to remove the solvent which has replaced the oil in the pores, by applying a moderate degree of heat. As these solvents are not costly and as a further step is always taken to fit the clay for a second use, it is often the case that no particular pains are taken to remove the last of this solvent.

When the oil has been dissolved out, and all or part of the solvent removed from the adsorbent material, the impurities taken from the oil still remain in the pores, and are often very firmly retained. That they must be so retained is proven by the very fact that they were in the first instance selectively adsorbed out of the oil in which they were in solution, an action which would not have taken place if these bodies had not had a superior attraction or affinity for the surface of the solid adsorbent.

These impurities completely cover the surfaces of the adsorbent (i. e., both outer and interior surfaces) and renders them incapable of effecting a further adsorption of the same material. In order to revivify the adsorbent and fit it for further use, these impurities must be either removed or destroyed.

In the case of granular adsorbents it is customary to strongly heat the gasoline-washed grains and pass air over or through the mass. By this means the adsorbed bodies, which are of a tarry nature, are partly burned away and partly destructively distilled leaving a residue of dry carbon which itself has some value as an adsorbent.

In the case of pulverent adsorbents this burning process is not very efficacious. The powder is so dense that it is difficult for the combustion air to penetrate its mass, so that it is very slow burning. The powder is liable to sinter or fuse, thereby destroying or reducing its porosity and its value. Finally, these powdered substances are very dusty when dried or drying, and often material losses are suffered. As a final result of the burning operation only a part of the original weight is recovered, at a considerable cost and in a depreciated quality.

It is therefore preferable and customary to revivify finely pulverized adsorbents by the use of solvents. By these the adsorption is in effect reversed, the adsorbed bodies leaving the surfaces of the solid and passing into solution. This reversal is usually tedious, because of the extreme dilution required to obtain the reversal effect, but with this we are not now concerned. We are, however, concerned with a condition which follows from it; that such solvents as are capable of reversing the adsorption are for this very reason themselves very strongly adsorbed by the solid, and are therefore difficult to completely remove when the extraction is finished.

Again, the greater the adsorptive power of the solid the more firmly will the solvent be retained. While the solvent may be removed from low-value natural clays by gentle heating for a relatively short time, the denser vegetable chars and some of the artificial aluminous and siliceous adsorbents can be completely dried out only at a high temperature or by long continued heating, either of which induces undesirable changes in the chemical or physical constitution of the adsorbent.

The chars are usually rather coarsely granular, and may be revived or activated by passing highly superheated steam over them, but this treatment does not work well with the clay-like adsorbents as, if they are kept at a high temperature, it is very difficult to prevent their being carried away, while at low temperatures they condense water and set to a very tough and sticky mud.

In view of all these difficulties and impediments it has usually been considered not commercially feasible to recover such artificial adsorbents as the residues from the treatment of the mineral montmorillonite or otaylite, and the mineral known locally as Death Valley clay. Such residues are greatly reduced in value by burning out, and suffer a severe loss of efficiency in extraction with solvents, or more likely in the drying which follows such extraction. As these materials are costly, a means for reviving them with a relatively large part of their original efficiency and at a commercially feasible cost is much to be desired.

I have discovered that by the proper selection of an organic solvent for this purpose, the removal of the excess of such solvent after extraction, and the application of water under suitable conditions to the solvent-wet adsorbent, a large proportion and in some cases the whole of the original value of the adsorbent may be revived, and this at a cost less than that heretofore incurred in regenerating a portion of the value.

No one particular organic solvent is required for the proper conduct of this process, though it is expedited if the solvent consists of a mixture of a water-insoluble with a water-soluble liquid. Because of the nature of the adsorbed bodies solvents so constituted usually are more active than simple liquids. I have found that a solvent consisting of a mixture of (coal tar) benzene or one or more of its homologues with an aliphatic alcohol is particularly desirable for this purpose. This mixed solvent is cheap, highly effective, not too volatile for reasonable safety, and is readily recovered from the dissolved matter by distillation. I prefer to use this solvent in the proportions in which it distills in constant percentage, which in the case of a mixture of benzene with ethyl alcohol is 67 parts of the former to 33 parts of the latter. In order to obtain the lowest possible cost a mixture of 80 parts of coal-tar solvent naphtha with 20 parts of commercial denatured alcohol may be used, with good results.

In applying my invention the spent adsorbent is preferably first washed essentially free from oil with any solvent for oil, such for instance, as petroleum gasoline, and a part or all of this solvent removed. This is not an essential step in my process, and may be omitted if desired, or the oil may be removed in any other manner as for instance by centrifuging, though if it is not completely removed a wastage of the second and more expensive solvent will be incurred.

The adsorbent is then extracted with an organic solvent suitable for removal of adsorbed bodies, such for instance as the alcohol-benzene solvent described, the adsorbent being washed repeatedly or continuously with the solvent, preferably with the aid of gentle heating, until extraction is essentially complete.

It is desirable for the sake of economizing the water soluble portion of the solvent, if there be such, to remove any excess of solvent from the adsorbent before proceeding to the next step. This may be done by applying pressure or by blowing air or other gas through the cake. If the best results are to be had, care should be taken to leave enough solvent to keep the cake slightly coherent and of a damp appearance. The most favorable condition is that in which the cake may be powdered by a slight pressure of the fingers.

The object in removing excess solvent is merely to accelerate the addition of water to clay, and in cases where mixed solvents having a water-soluble constituent are used, to prevent the loss of an undue proportion of this constituent. If the solvent contains no water-soluble element there is no particular object in removing all of the excess solvent, as it is recovered in a later stage in the process.

It is not necessary to absolutely complete the extraction and it is preferably carried only so far that the solution taken from the last wash has a yellow or light brownish shade. The last traces of tarry bodies are difficult to remove, and to leave them behind causes only a slight drop in the efficiency of the recovered adsorbent.

The next step in my process is to immerse the broken up cake in such quantity of water as will suffice to a little more than cover it. As the water is taken up by the adsorbent, more water is added, and it is desirable to bring the mass to a creamy or muddy condition and to maintain it in that state.

It is usually desirable to apply both heat and agitation. Heat may be applied by any of the well known means, such as steam pipes or a fire. Agitation is preferably supplied by some type of slow-moving paddle or other mechanical mixer. Jets of steam conducted to the bottom of the mass may be used for both heat and agitation.

Mixing of the mass is continued until the adsorbent is thoroughly wetted and soaked with water. If the solvent used is entirely insoluble in water it will require some little time for the water to displace it from the pores and thus wet the adsorbent, but it is necessary to agitate and usually to heat until the repulsion for water which the adsorbent first shows is overcome, and the cake breaks down to an aqueous mud. If the solvent contains a water-soluble element, even in quite small quantity, the cake does not display this repulsion for water, but breaks down very rapidly and readily to a mud of any desired consistency.

As fast as the adsorbent becomes wetted with water the solvent is displaced, and will rise slowly to the surface of the mud if the latter is kept liquid enough to permit this movement. I prefer to mix and heat the mud in a closed tank or still provided with a condenser, and to boil the mud gently until all the solvent is driven off, the steam and the solvent vapors being condensed. This greatly hastens the operation, as the solvent distills off much faster than it will rise to the surface of the mud; the solvent is recovered at one step in a clean and usable condition; and the entire operation may be carried out in one piece of apparatus.

If it is desired to operate in a simpler manner but at some sacrifice of efficiency, the mudding of the clay may be conducted in an open tank, the mud being stirred and then allowed to rest until a layer of solvent (which will always carry some mud and water) rises to the surface. This is then skimmed off, and the operation of stirring and settling repeated until no more solvent is thrown off and the powder is completely and smoothly mudded.

The adsorbent has now been revivified to the fullest extent, and may be applied to hot oils in the form of a mud by merely settling and decanting any excess water, or the excess of water may be removed by filtration or other of the well known means for separating liquids from solids.

While I prefer to use water as such in mudding the adsorbent powder it is not necessary to do so, as wet steam may be used in its place. Where steam is used, it is blown over or into the mass of solvent-wet adsorbent, and being condensed on such adsorbent by its heat absorbing capacity and by radiation from the apparatus, yields water which acts on the powder as above stated. Unless artificial cooling of a portion of the steam is resorted to, only a limited amount of water will be thus produced, and if this amount of water does not suffice to reduce the powder to a mud of the proper consistency, more water must be added.

By maintaining the revivified spent adsorbent in a muddy condition until utilized as a decolorizing agent for oils, the mineral earth utilized as the adsorbent is charged or filled so to speak with water which is displaced by the oil undergoing treatment for the decolorization thereof. The water is very readily displaced from the pores of the adsorbent on bringing a water soaked adsorbent into contact with an oil hot enough to boil said water and by bringing about a contact in this manner the adsorbent is perfectly protected from the action of air, which air if allowed to be adsorbed by the adsorbent is much more difficult to drive out than is the water, and therefore the mudded condition of the decolorizing body provides a more efficient and active adsorbent than otherwise would be the case and presents a greater or larger area of activity of the adsorbent for the oil than is obtained when the adsorbent is brought into contact with the oil in a dry condition and impregnated with air.

Having thus described my invention, what I claim as new and desire to protect by Letters Patent of the United States, is:—

1. The method of revivifying spent oil purifying adsorbents for the production of a mudded body for the decolorization of oils, which consists in washing from the spent adsorbent the entrained oil with an organic solvent for the oil, then washing out the adsorbed bodies with an organic solvent for such bodies, then separating any excess quantity of such solvent and finally treating the adsorbent with water for the separation of the remainder of such solvent and leaving the revivified spent adsorbent in a thickened mudded or plastic condition.

2. The method of revivifying spent oil purifying adsorbent which consists in washing the absorbent with an organic solvent to free the same of entrained oil, then washing out the adsorbed bodies with an organic solvent for such bodies, then treating the adsorbent with water for the separation therefrom of the remainder of such solvent and placing the revivified spent adsorbent in a thickened, mudded, or plastic condition and maintaining the same in such condition until introduced into oil to be treated for the decolorization thereof.

3. The method of revivifying and placing spent oil purifying adsorbent in a mudded condition for use in connection with the decolorization of oils, which consists in washing out the entrained oil with an organic solvent for such oil, washing out the adsorbed bodies with an organic solvent therefor, separating any excess quantity of such solvent, boiling the separated adsorbent with water, and leaving the adsorbent in a mudded form.

4. The method of revivifying and the placing of spent oil purifying adsorbent in a mudded form for use in the decolorization of oils, which consists in washing out the entrained oil with an organic solvent for such oil, washing out the adsorbed bodies with an organic solvent for such bodies, boiling the washed adsorbent with water, and leaving the revivified adsorbent in a mudded condition.

5. The method of revivifying spent oil purifying adsorbent in a mudded condition for use in the decolorization of oils, which consists in washing out the entrained oil contained therein with an organic solvent for oil, washing out the adsorbed bodies with an organic solvent for such bodies, treating the separated adsorbent with steam, and leaving the revivified adsorbent in a mudded form.

6. The method of revivifying spent oil purifying adsorbent for the production of a mudded body for the decolorization of oils, which consists in the washing of the adsorbent with an organic solvent to free the same of entrained oil, then washing out the adsorbed bodies with an organic solvent for such bodies, then treating the adsorbent with water under agitation for the separation of the remainder of such solvent and placing the revivified spent adsorbent in a thickened mudded or plastic condition and maintaining the same in such condition until introduced into the oil to be treated for the decolorization thereof.

7. The method of revivifying spent oil purifying adsorbent for the production of a mudded body for the decolorization of oils, which consists in washing from the adsorbent entrained oil and adsorbent bodies with an organic solvent for such bodies, then treating the adsorbent with water for the placing of the revivified spent adsorbent in a thickened, mudded or plastic condition and maintaining the same in such condition until introduced into the oil to be treated for the decolorization thereof.

In testimony whereof I have signed my name to this specification.

PAUL W. PRUTZMAN.